(12) United States Patent
Arnold et al.

(10) Patent No.: US 8,691,306 B2
(45) Date of Patent: Apr. 8, 2014

(54) PROCESS FOR THE ELECTROPORATION OF BEET COSSETTES AND DEVICE FOR CARRYING OUT THIS PROCESS

(75) Inventors: Jochen Arnold, Obrigheim (DE); Stefan Frenzel, Weinheim (DE); Thomas Michelberger, Grünstadt (DE); Peter Scherer, Ebertsheim (DE); Timo Scheuer, Worms (DE); Matthias Weibel, Ebertsheim (DE)

(73) Assignee: Sudzucker Aktiengesellschaft Mannheim/Ochsenfurt (DE)

( * ) Notice: Subject to any disclaimer, the term of this patent is extended or adjusted under 35 U.S.C. 154(b) by 536 days.

(21) Appl. No.: 12/989,097

(22) PCT Filed: Apr. 21, 2009

(86) PCT No.: PCT/EP2009/002886
§ 371 (c)(1),
(2), (4) Date: Oct. 22, 2010

(87) PCT Pub. No.: WO2009/129991
PCT Pub. Date: Oct. 29, 2009

(65) Prior Publication Data
US 2011/0038992 A1 Feb. 17, 2011

(30) Foreign Application Priority Data
Apr. 24, 2008 (DE) .................. 10 2008 020 429

(51) Int. Cl.
A23C 3/00 (2006.01)
(52) U.S. Cl.
USPC .......... 426/238; 426/237; 426/431; 426/231; 426/425; 426/518; 426/519; 426/244; 426/247; 99/451; 99/510

(58) Field of Classification Search
USPC ........ 426/238, 431, 237, 231, 425, 518, 519, 426/244, 247; 99/510, 451
See application file for complete search history.

(56) References Cited

U.S. PATENT DOCUMENTS

| 2,830,904 | A | * | 4/1958 | Arentoft et al. ................. 426/16 |
| 3,215,559 | A | * | 11/1965 | Lippe et al. ..................... 127/43 |
| 3,953,224 | A | | 4/1976 | Dietzel et al. |
| 4,544,559 | A | * | 10/1985 | Gil et al. ......................... 426/72 |
| 4,753,810 | A | | 6/1988 | Scheglov et al. |
| 5,627,346 | A | | 5/1997 | Weibel et al. |
| 5,747,088 | A | | 5/1998 | Fletcher |

(Continued)

FOREIGN PATENT DOCUMENTS

| CN | 1726291 A | 1/2006 |
| DE | 156392 | 1/1902 |

(Continued)

OTHER PUBLICATIONS

International Search Report dated Aug. 5, 2009, issued in corresponding international application No. PCT/EP2009/002886.

(Continued)

*Primary Examiner* — Drew Becker
*Assistant Examiner* — Preston Smith
(74) *Attorney, Agent, or Firm* — Ostrolenk Faber LLP

(57) ABSTRACT

A process and an installation for the improved extraction and subsequent recovery of contents from sugar beets (*Beta vulgaris*) or from sugar beet cossettes.

23 Claims, 5 Drawing Sheets

(56) References Cited

U.S. PATENT DOCUMENTS

| | | |
|---|---|---|
| 6,598,516 B1 * | 7/2003 | Gonon .......................... 99/455 |
| 8,163,091 B2 | 4/2012 | Frenzel et al. |
| 2002/0082342 A1 * | 6/2002 | Jakubowski et al. ......... 524/589 |
| 2004/0166019 A1 | 8/2004 | Schultheiss |
| 2005/0175750 A1 * | 8/2005 | Sanders ....................... 426/481 |
| 2006/0106210 A1 | 5/2006 | Frenzel et al. |
| 2007/0202601 A1 | 8/2007 | Swoboda |
| 2008/0060637 A1 * | 3/2008 | Arnold et al. .................... 127/4 |

FOREIGN PATENT DOCUMENTS

| | | | |
|---|---|---|---|
| DE | 960260 C | 3/1957 | |
| DE | 1076589 | 2/1960 | |
| DE | 1567259 A1 | 10/1970 | |
| DE | 10144479 A1 | 3/2003 | |
| DE | 10144486 C1 | 4/2003 | |
| DE | WO2005123967 * | 12/2005 | ............... C13D 1/08 |
| EP | 1825765 A | 8/2007 | |
| EP | 1994836 A | 11/2008 | |
| JP | 60-048826 A | 3/1985 | |
| JP | 4-503714 A | 7/1992 | |
| JP | 06-220844 A | 8/1994 | |
| JP | 8-006105 B | 1/1996 | |
| JP | 2003-019473 A | 1/2003 | |
| JP | 2004-325725 | 11/2004 | |
| JP | 2005-131466 A | 5/2005 | |
| JP | 5128758 | 11/2012 | |
| SU | 764643 | 7/1978 | |
| SU | 1005758 | 3/1983 | |
| WO | WO 2005/123967 A | 12/2005 | |
| WO | WO 2007/045035 A1 | 4/2007 | |

OTHER PUBLICATIONS

Schultheiss, C. et al: "Principle of electroporation and development of industrial devices." Zuckerindustrie 129 (2004) Nr. 1, 40-44.

Office Action Aug. 21, 2012 in corresponding Chinese Patent Application No. 200980124947.0 with English translation).

A. J. Zagorulko, A. Ya.; Novye Fiz. Metody Obrabotki Pishch. Produktivo, "Technical Indices and Main Parameters of the Method for Extracting Sugar from Beet Roots by Means of Selective Electroplasmolysis," Scientific Research Institute of the Sugar Industry, 1958, vol. 1, pp. 21-27.

I. Guily et al. "Technological Innovations in the Beet Sugar Production," CITS Proceedings Madrid 2003, International Commission for Sugar Technology, published by A. Bartens, 2003, pp. 303-315.

English language translation of the International Preliminary Report on Patentability Chapter I of the Patent Cooperation Treaty)(Form PCT/IB/373) and Written Opinion of the International Searching Authority Form PCT/ISA/237) in corresponding International Application No. PCT/EP2009/002886.

Notice of Reasons for Rejection dated Jun. 25, 2013 in corresponding Japanese Patent Application No. 2011-505418 (with English language translation).

* cited by examiner

PROCESS FOR THE ELECTROPORATION OF BEET COSSETTES AND DEVICE FOR CARRYING OUT THIS PROCESS

CROSS REFERENCE TO RELATED APPLICATIONS

The present application is a 35 U.S.C. §371 National Phase conversion of PCT/EP2009/002886, filed Apr. 21, 2009, which claims benefit of German Application No. 10 2008 020 429.3, filed Apr. 24, 2008, the disclosure of which is incorporated herein by reference. The PCT International Application was published in the German language.

TECHNICAL FIELD

The present invention relates to a process for the improved extraction and subsequent recovery of contents from plant material, in particular sugar beets (*Beta vulgaris*) or from sugar beet cossettes. Furthermore, the present teaching also relates to an installation for carrying out the process.

BACKGROUND

To isolate contents from biological materials, it is generally necessary to open the cell membranes of the biological material. Various possibilities for this exist. In particular in sugar production, it is customary for sugar beets initially to be mechanically worked by cutting, grating or rolling. Slicing machines are generally used for processing sugar beets into pencil-thick cossettes. In the further course of the procedure, contents are extracted by thermal cell disintegration. This involves the cell membranes of the beet cossettes being denatured by the thermal influence, allowing isolation of the contents that are to be recovered. In addition, the process of electroporation has been known for several decades. By applying a voltage, it is possible to permeabilize the cell membranes. Following the electroporation, extraction is therefore possible.

DE 101 44 486 C1 describes a process for the disintegration of biological cells on an industrial scale with pulsed electric fields. The process described is performed by a reactor which is integrated in a process line. The processed-product or transporting line is flowed through in the region of the reactor by liquid, in order in this way to expose the biological material to the effect of the pulsed electric fields.

SU 100 57 58 A describes an electroporation process for biological material including beets. In the process described it is provided that, in a cutting apparatus, the beets are alternately electroporated and then cut.

DE 101 44 479 A1 likewise describes an electroporation process for whole beets. The process is carried out in a drum reactor. The drum reactor comprises a water-filled tank in which the drum can rotate. The beets to be electroporated are drawn by the drum through the water by means of fingers fastened to the drum. The electroporation is brought about by electrodes and counter electrodes that are respectively located on the bottom of the tank and on the drum.

Apart from the electroporation of whole beets, the electroporation of beet cossettes is also known.

SU 764 643 describes the electroporation of sugar beet cossettes. The electroporation is performed here by the cossettes being transported by means of a conveying installation, this conveying installation comprising a conductive belt.

Zagorulko (Zagorulko, A.Ya.; Novye Fiz. Metody Obrabotki Pishch. Produktivo, 1958, vol. 1, 21-27) describes an electroporation device for the electroporation of sugar beet cossettes. The device comprises two fluted rotors, which rotate in opposite directions and force the cossettes through a gap of 1 to 2 mm in which the electric field acts.

A disadvantage of the previous processes is that the installations described provide that the beets or beet cossettes for extraction are transported by forced conveyance by means of belts, rollers, conveying drums or the like. This forced conveyance has the effect that the beet cossettes break before extraction as a result of the considerable mechanical stress, and consequently are to a great extent damaged. This in turn leads to lower efficiency in the downstream extraction. Valuable contents to be isolated can be lost in this way.

Guily et al. (CITS Proceedings Madrid 2003, Intern. Commission for Sugar Technology, pages 303 to 315, published by A. Bartens, 2003) describes a further possibility for transporting beet cossettes into an electroporation installation. Accordingly, a mixture of cossettes and liquid is pumped into the electroporation device. However, this presupposes that the cossettes are largely in an individually separated state, in order to prevent blockage and clogging during transport. A disadvantage of this is that it means that a high packing density of the beet cossettes during the electroporation cannot be made possible. This correspondingly also has the consequence of lower extraction efficiency.

SUMMARY

The present invention is therefore based on the technical problem of providing a process for obtaining contents from plant material, particularly preferably for the electroporation of plant material, in particular sugar beets or sugar beet cossettes, that is simple to carry out, is not susceptible to faults, in particular blockage, and is improved, in particular with an improved yield, on the one hand achieving a high packing density of the comminuted plant material, in particular the beet cossettes, and on the other hand preventing mechanical loading and damage of the comminuted plant material, in particular the beet cossettes, before the treatment that releases the contents, in particular before the electroporation.

The present invention relates to a process for the extraction of contents from plant material, comprising the steps of (a) comminuting the plant material into comminuted plant material forming a solid phase, (b) mingling the comminuted plant material into a transporting liquid while obtaining a solid phase and a liquid phase, (c) pressurelessly washing the solid and liquid phases into a contactlessly operating reaction chamber, (d) transporting the solid and liquid phases through the contactlessly operating reaction chamber with simultaneous contactless application of energy for the extraction of the contents from the plant material, and (e) suction-assisted discharging of the liquid and solid phases having the extracted contents, the liquid phase being sucked away by means of a sucking element and the solid phase being discharged from the reaction chamber by means of a conveying element acting mechanically on it.

The present invention relates in particular to a process where the contactlessly operating reaction chamber is a mechanical reaction chamber.

In a preferred embodiment, the reaction chamber is an electrical reaction chamber.

In connection with the present invention, a contactlessly operating reaction chamber is a reaction chamber in which the comminuted plant material is exposed to energy such that contents are released without any mechanical or physical action being applied to the plant material, in a preferred embodiment the energy being electrical energy and/or sound energy, in particular ultrasound energy. The term "contactlessly" is understood in particular as meaning that the plant material is neither pressed, crushed, squeezed or comminuted by mechanical elements nor otherwise contacted by mechanical elements by means of direct physical action, the contact of the plant material with the reaction chamber wall not constituting contact in the sense of the present invention. In connection with the present invention, contactless treatment or contactless action is therefore understood as meaning treatment in the course of which the release of contents from plant material can be achieved without there being any physical contact of the plant material with an element or device emitting energy, for example pressure or frictional energy, to the plant material.

The mechanical reaction chamber of the present invention has in a preferred embodiment a device for emitting sound energy, in particular ultrasound energy and/or shock waves.

The present invention therefore also relates in one embodiment to a process where the contactless action is an ultrasound or shock-wave treatment.

In a particularly preferred embodiment, the contactlessly operating reaction chamber is configured as a mechanical reaction chamber and an electrical reaction chamber, i.e. has both a device for emitting ultrasound and/or shock-wave energy and a device for emitting electrical energy.

The present invention comprises in particular a process for the extraction of contents from plant material, comprising the steps of (a) comminuting the plant material into comminuted plant material forming a solid phase, (b) mingling the comminuted plant material into a transporting liquid while obtaining a solid phase and a liquid phase, (c) pressurelessly washing the solid and liquid phases into an electrical reaction chamber, (d) transporting the solid and liquid phases through the electrical reaction chamber while simultaneously carrying out an electrical treatment for the extraction of the contents from the comminuted plant material, and (e) suction-assisted discharging of the liquid and solid phases having the extracted contents, the liquid phase being sucked away by means of a sucking element and the solid phase being discharged from the electrical reaction chamber by means of a conveying element acting mechanically on it.

The invention solves the technical problem on which it is based by a process for the extraction of contents, in particular sugar, from beets, in particular sugar beets, comprising the steps of:

(a) comminuting the beets, in particular sugar beets, into beet cossettes forming a solid phase, (b) introducing, in particular mingling, the beet cossettes into a transporting liquid while obtaining a solid phase and a liquid phase, in particular a beet-cossette/transporting-liquid mixture, (c) pressurelessly washing the solid and liquid phases into an electroporation device, (d) transporting the solid and liquid phases through the electroporation device while simultaneously carrying out an electroporation for the extraction of the contents from the beet cossettes, and (e) suction-assisted discharging of the liquid and solid phases having the extracted contents, the liquid phase being sucked away by means of a sucking element and the solid phase being discharged from the electroporation device by means of a conveying element acting mechanically on it.

In a first step, the procedure according to the invention therefore envisages providing plant material, in particular beets, which are comminuted, in particular into comminuted plant material, in particular beet cossettes.

The present invention is described below in a particularly preferred embodiment, to be specific the extraction of contents from plant material by means of an electrical reaction chamber and an electroporation carried out in it. However, the actual technical teachings specified below also relate in substantially the same way to the use of a contactlessly operating mechanical reaction chamber and a treatment carried out in it with sound waves, in particular ultrasound energy and/or shock waves.

DETAIL DESCRIPTION

In the following presentation of the invention, the invention is described on the basis of a particularly preferred embodiment of the invention, to be specific sugar beets and the beet cossettes produced by comminuting the sugar beets. However, the present invention can also be used for other plant material, in particular plant material in piece form, for example sugar cane, chicories, potatoes, carrots, fruit, in particular apples, and so the description of the invention on the basis of the beets is given by way of example for other plant materials in piece form too.

The procedure according to the invention is therefore a procedure according to which the solid and liquid phases having the comminuted plant material, for example beet cossettes, are washed in co-current into the electrical reaction chamber, in particular electroporation device, and transported through it, the two phases being removed from the electrical reaction chamber by means of at least one sucking element and at least one conveying element.

In a particularly preferred embodiment, no conveying elements that serve for transporting the comminuted plant material are provided in the electrical reaction chamber, in particular the electroporation device. In a particularly preferred embodiment, the present invention envisages providing at least one conveying element and at least one sucking element only downstream, i.e. after, the electrical reaction chamber, in particular the electroporation device.

In a particularly preferred embodiment, a plant material is understood as meaning, in particular, a plant material in piece form, preferably sugar beet, sugar cane, chicory, potato, carrots and fruit, in particular apples.

In connection with the present invention, an electrical reaction chamber is understood as meaning a device or part of a device in which electric currents or electric fields or electric currents and electric fields act on target materials, in particular the solid and liquid phases transported according to the invention through the electrical reaction chamber. In particular, in connection with the present invention, an electrical reaction chamber is understood as meaning an electroporation device.

The invention also provides that the comminuted plant materials, in particular beet cossettes, are introduced, in particular mingled, into a transporting liquid, in particular a beet extract or water, and then washed into an electrical reaction chamber, preferably formed as a tube or shaft reactor, preferably an electroporation device, then compacted into a plant material pack, in particular cossette pack, of a specific packing density and, in the form of this packing density obtained, conveyed through the electrical reaction chamber, in particular through the electroporation shaft or tube reactor, and electrically treated, in particular electroporated, it being advantageously possible for the speed of the comminuted plant material, in particular that of the beet cossettes, as well as the density of the cossette pack, to be specifically set by the sucking element and the conveying element. The conveying element serves the purpose of conveying the electrically treated, in particular electroporated, materials, in particular cossettes, at a defined speed, while the sucking element, preferably arranged downstream of the conveying element, sucks in the mixture of comminuted plant material and transporting liquid, in particular the beet-cossette/transporting-liquid mixture, which is advantageously also accompanied by the effect that water is sucked through the cossettes. The sucking element therefore serves for sucking in the liquid phase and determines the speed thereof, but as a result also has an effect on the packing density, i.e. bulk density, and transporting speed of the entrained materials in the liquid phase in the electroporation device, for example beet cossettes. The sucking element accordingly exerts a suction on the solid and liquid phases washed into the electrical reaction chamber, in particular electroporation device, which transports these two phases through the electrical reaction chamber, in particular electroporation device, to at least the sucking element itself.

In a particularly preferred embodiment, the present invention provides that the speed of the transport of the solid phase is set by the conveying element acting mechanically on the solid phase and the speed of the transport of the liquid phase is set by the sucking element, preferably separately from each other.

According to the invention, the transporting speed of the comminuted plant materials, in particular the cossettes, in the electrical reaction chamber, in particular the electroporation device, can be specifically set by the conveying element. According to the invention, the sucking element can contribute to specifically setting the packing density, i.e. the bulk density, of the comminuted plant materials, in particular the cossettes, in the electrical reaction chamber, in particular the electroporation device, and so a constantly high packing density can be set in the shaft by the combined action of the two elements. The procedure according to the invention envisages that a forced conveyance of the comminuted plant materials, in particular the beet cossettes, that is to say for example by means of particularly mechanically acting devices such as belts, rollers, pressure-exerting and pushing elements, does not take place before the electrical reaction chamber, in particular the electroporation device, but only after it, that is to say downstream. In a preferred embodiment of the present invention, it therefore provides a process in which no mechanical conveyance, in particular no mechanical conveying elements, also referred to here as forced conveyance, is/are arranged upstream of, i.e. before, or in the electrical reaction chamber.

Advantageously, this type of conveyance is particularly gentle, because the comminuted plant materials, in particular the beet cossettes, are not exposed to any destructive mechanical action, in particular before and during the electrical treatment, in particular the electroporation, and are constantly conveyed in a water bath, so only a minimal degree of destruction occurs.

In connection with the present invention, suction-assisted discharging of the liquid and solid phases having the extracted contents is understood as meaning that the solid and liquid phases are sucked through the electrical reaction chamber, in particular the electroporation device, by using the sucking element provided according to the invention, a selective setting of the cossette packing density thereby occurring in a preferred embodiment, in particular in conjunction with the transport of the solid phase by the conveying element.

In connection with the present invention, a conveying element acting mechanically on the solid phase is understood as meaning an element which is capable of transporting a solid phase, in particular beet cossettes, and this transport being brought about by a part of the conveying element that is movable and in physical contact with the transported product. Conveying elements may be, for example, transporting rollers, belts, worms, drums or the like. These elements are also referred to here as forced conveying elements.

The present invention also relates to an installation for the extraction of contents from plant material, in particular for carrying out a process of the present invention, comprising at least one device for comminuting plant material into comminuted plant material forming a solid phase and for introducing the comminuted plant material into a transporting liquid, at least one following tubular or shaft-like device for transporting the obtained mixture of transporting liquid and comminuted plant material with a plant-material introducing region and a plant-material removing region, at least one contactlessly operating reaction chamber arranged in the transporting device and at least one device arranged downstream of the plant-material removing region for discharging the contactlessly treated mixture of comminuted plant material, there being in the discharging device at least one conveying element, arranged for discharging the contactlessly treated mixture of transporting liquid and plant material, and at least one sucking element.

In a preferred embodiment, the present invention also relates to an installation, the contactlessly operating reaction chamber being a mechanical and/or electrical reaction chamber.

In a preferred embodiment, the contactlessly operating mechanical reaction chamber has a device for emitting ultrasound and/or shock waves.

The technical problem addressed by the present invention is also solved by an installation for the extraction of contents from comminuted plant material, in particular beet cossettes, comprising at least one device for comminuting plant material, in particular beets, into a comminuted plant material forming a solid phase, in particular beet cossettes, and optionally a device for mingling the comminuted plant material, in particular the cossettes, into a transporting liquid, at least one following, preferably tubular or shaft-like, device for transporting the obtained solid and liquid phases with an upstream plant-material introducing region, in particular a beet-cossette introducing region, and a downstream plant-material removing region, in particular a beet-cossette removing region, at least one electrical reaction chamber, in particular a device for electroporation, arranged in the transporting device and at least one device arranged downstream of, that is to say after or under, the plant-material removing region, in particular the beet-cossette removing region, for discharging the electrically treated plant material, that is to say the mixture of comminuted plant material and transporting liquid, in particular the electroporated beet-cossette/transporting-liquid mixture, there being in the device for discharging the electrically treated plant material, that is to say the mixture of comminuted plant material and transporting liquid, in particular electroporated beet-cossette/transporting-liquid mixture, at least one conveying element and at least one sucking element, and in a preferred embodiment, the sucking element following on from the conveying element, that is to say being arranged after it, that is to say downstream.

In a particularly preferred embodiment, the conveying element and the sucking element operate in co-current. In a particularly preferred embodiment, no conveying elements are arranged upstream of, i.e. before, or in the reaction chamber, in particular the electrical reaction chamber.

The invention therefore also relates in a preferred embodiment to the aforementioned installation, it being possible in a preferred embodiment for the preferably tubular or shaft-like device for transporting the obtained solid and liquid phases to be positioned vertically or horizontally. In a further preferred embodiment, it may be provided that, in the installation according to the invention, the device for discharging the electrically treated plant material, that is to say the mixture of comminuted plant material and transporting liquid, in particular electroporated beet-cossette/transporting-liquid mixture, is arranged perpendicularly or substantially perpendicularly in relation to the tubular or shaft-like transporting device.

Carrying out the procedure according to the invention, the transport of the comminuted plant material, in particular the beet cossettes, and the transporting liquid by the combined use of a conveying element and a sucking element is surprising for one reason, among others, that it had been assumed that the sucking effect produced would cause blockage and clogging within the transporting path. It was previously therefore assumed that transport of the comminuted plant material, in particular of beet cossettes, by a pumping device is only possible with a low packing density.

According to the invention, it has now been possible to show that the transport of the comminuted plant material, in particular of beet cossettes, can be performed by the joint use of a conveying element and a sucking element even with very high packing densities. This is made possible in particular by the speed of the transport of the solid phase of the comminuted plant material, in particular the beet cossettes, being set by a mechanically acting conveying element and the speed of the transport of the liquid phase of the comminuted plant material, in particular the liquid phase of the beet cossettes, being set by a sucking element. The setting of the speed of the solid phase is therefore performed separately from that of the liquid phase. The combined use of a conveying element and a sucking element and the preferably provided separate setting of the transporting speeds of the two phases makes it possible particularly well to achieve a sucking effect which leads to a high throughput and a high compaction within the solid phase, without thereby causing mechanical damage of the solid phase to any great extent. The invention therefore makes use of largely gentle transport of the solid phase in a liquid phase, brought about by the sucking element, combined with a speed and packing density control of the solid phase by the conveying element that can be mechanically set separately. Forced conveyance of the solid phase therefore only takes place after the electrical treatment, in particular electroporation, and, according to the invention, is combined with a sucking effect. Without being tied to the theory, a high packing density is achieved by the different physical properties of the solid and liquid phases within the mixture of comminuted plant material and transporting liquid, in particular the beet-cossette/transporting-liquid mixture.

In an advantageous preferred refinement of the invention, a faster speed of the transport of the liquid phase in comparison with the transporting speed of the solid phase brings about a sucking effect. This sucking effect results in an advantageous and particularly pronounced increase in the packing density of the solid phase in the mixture of comminuted plant material and transporting liquid, in particular the beet-cossette/transporting-liquid mixture, that is particularly preferred according to the invention. The provision of a high packing density of the solid phase of the comminuted plant material, in particular the beet cossettes, makes particularly efficient electrical treatment possible, in particular electroporation, and subsequently also extraction. The invention therefore provides a particularly efficient and low-cost process and device for carrying it out.

In a preferred embodiment, the invention provides that, in a first process step (a), sugar beets are comminuted into beet cossettes. Subsequently, in a process step (b), the beet cossettes are introduced, in particular mingled, into a transporting liquid, for example an extract, beet extract and/or water. The beet-cossette/transporting-liquid mixture produced is made up of a solid phase, to be specific the beet cossettes, and a liquid phase, to be specific the transporting liquid, optionally with beet juice or extract. In connection with the present invention, "beet cossettes" should be understood as meaning cut-up beets, for example beets cut into pencil-thick pieces or slices. According to the invention, it is preferably envisaged to process beets into beet cossettes by means of a slicing machine.

In the process according to the invention it is provided that, in step (c), the solid and liquid phases enter an electroporation device by pressureless washing in. In connection with the present invention, "pressureless washing in" should be understood as meaning introduction of the solid and liquid phases into the electrical reaction chamber, in particular electroporation device, without additional aids, such as forced conveyance, in particular by means of conveying worms, conveying belts, conveying drums, rollers or the like.

According to the invention, forced conveyance of the solid phase does not take place before the electrical treatment, in particular electroporation, but only thereafter. In particular, in a preferred embodiment, pressureless washing in should also be understood as meaning introduction without additional pumping as an aid for forcing or pressing the transported product into the electrical reaction chamber, in particular electroporation device. Pressureless washing in should consequently be understood preferably as meaning introduction based in particular on gravitational force, preferably on gravitational force alone, of the solid and liquid phases into an electrical reaction chamber, in particular electroporation device. The pressureless introduction may also be brought about by capillary forces produced within the liquid phase of the beet-cossette/transporting-liquid mixture.

The solid phase of the beet-cossette/transporting-liquid mixture in step (d) of the process according to the invention is transported further, and simultaneously electroporated, in the electroporation device. The electroporation takes place using the parameters familiar to a person skilled in the art. In a particularly preferred embodiment, electric field pulses of 0.1 to 50 kV/cm, preferably 0.5 to 40 kV/cm and pulse numbers of 1 to 2500, in particular 1 to 1000, preferably 1 to 100, particularly preferably 1 to 50 pulses/s, may be used. In a further particularly preferred embodiment, the electroporation takes place at temperatures of 0 to 75° C., preferably 0 to 45° C., in particular 10 to 35° C.

According to the invention, it is provided that, after the electrical treatment, in particular electroporation, the solid and liquid phases of the mixture of comminuted plant material and transporting liquid, in particular beet-cossette/transporting-liquid mixture, that have the extracted contents are discharged in step (e). The speed of the transport and the packing density of the solid phase are set by a conveying element, which acts mechanically on the solid phase, whereas the speed of the transport of the liquid phase is set by a sucking element. In particular, it is provided that the speed of the transport of the solid phase and that of the liquid phase are set by the conveying element and the sucking element largely independently of each other.

In a preferred embodiment it is provided that the conveying element is a worm, preferably a drawing-out worm, a transporting worm or a conveying belt.

In a further preferred embodiment it is provided that the sucking element is a pump, preferably a centrifugal pump.

According to the invention, it is provided in a preferred embodiment that the speed of the transport of the solid phase is 30 to 80 tonnes of beet cossettes/h, preferably 40 to 70 tonnes of beet cossettes/h, in particular 45 to 60 tonnes of beet cossettes/h, preferably 50 tonnes of beet cossettes/h.

In a preferred embodiment of the present invention, this speed is set in a conveying element formed as a worm, preferably with rotational speeds up to a maximum of 500 rpm, preferably of 1 to 500 rpm, in particular of 100 to 500 rpm, more preferably of 200 to 400 rpm.

In a particularly preferred embodiment of the invention it is provided that a packing density of the solid phase of 0.5 to 0.8 $g/cm^3$, preferably of 0.6 to 0.7 $g/cm^3$, in particular of 0.65 $g/cm^3$, is set.

In a further preferred embodiment it is envisaged to use the sucking element formed as a pump at rotational speeds of up to a maximum of 1200 rpm. Furthermore, rotational speeds of the pump of 750 to 1200 rpm are preferred, preferably of 800 to 1100 rpm.

In a further preferred embodiment it is provided that the speed of the transport of the liquid phase is higher than that of the solid phase.

In a further embodiment it is provided that, in steps (a), (b), (c) or (d), raw juice or water is additionally added to the solid phase, the mixture of comminuted plant material and transporting liquid, in particular the beet-cossette/juice mixture.

A further subject of the present invention is an installation for the extraction of contents from comminuted plant material, in particular beet cossettes, that is used for carrying out the process according to the invention. According to the invention, this installation for the extraction of contents from comminuted plant material, in particular beet cossettes, preferably has at least one device for comminuting plant material, in particular beets, and for mingling the comminuted plant material, in particular the beet cossettes, into a transporting liquid to obtain a mixture of comminuted plant material and transporting liquid, in particular a beet-cossette/transporting-liquid mixture, with comminuted plant materials, in particular beet cossettes, forming a solid phase and a transporting liquid forming a liquid phase, at least one following, preferably shaft-like or tubular, in particular horizontally or vertically positioned, device for transporting the obtained mixture of comminuted plant material and transporting liquid, in particular a beet-cossette/transporting-liquid mixture, with a beet-cossette introducing region, arranged in particular before or above, that is to say upstream, and a plant-material introducing region, in particular beet-cossette removing region, arranged in particular after or below, that is to say downstream, at least one electrical reaction chamber, in particular a device for electroporation, arranged in the transporting device, at least one device for discharging the electrically treated mixture, in particular the electroporated beet-cossette mixture, arranged in particular after or below, that is to say downstream of the plant-material removing region, in particular beet-cossette removing region, preferably substantially perpendicularly in relation to the tubular or shaft-like device, there being in the device at least one conveying element, arranged for discharging the electrically treated plant material, that is to say the mixture of comminuted plant material and transporting liquid, in particular electroporated beet-cossette/transporting liquid mixture, and there being at least one sucking element, and the sucking element preferably following on from the conveying element.

In a way preferred according to the invention, it may be envisaged to configure the aforementioned device for transporting the obtained mixture, in particular the beet-cossette/transporting-liquid mixture, in one piece with the device for electroporation, that is to say integrated with it. In a particularly preferred embodiment, the electrical reaction chamber, in particular the device for electroporation, is a tubular or shaft-like device, in particular a tube or shaft reactor, which serves both for transporting the plant-material mixture, in particular the beet-cossette/transporting-liquid mixture, and for the electrical treatment, in particular electroporation, thereof. It may, however, also be envisaged to provide a separate device for transporting the obtained mixture, in particular the beet-cossette/transporting-liquid mixture, which is arranged, for example, before the electrical reaction chamber, in particular electroporation device, or after it, or before and after it, or the electrical reaction chamber, in particular electroporation device, being positioned in the transporting device.

In a preferred embodiment it is provided that both the sucking element and the conveying element are arranged downstream of, that is to say after or below, the electrical reaction chamber, in particular the electroporation device. The sucking element therefore sucks in the liquid phase and draws it through the transporting and electroporation device. The conveying element acting mechanically on the solid phase conveys the electrically treated, in particular electroporated, solid-phase material, largely freed of contents of interest, away from the electrical reaction chamber, in particular the electroporation device.

According to the invention, "vertically positioned" is understood as meaning a setup within the installation that is perpendicular, preferably substantially perpendicular, to the Earth's surface on which the installation is indirectly or directly constructed. Correspondingly, vertically positioned should be understood as meaning an alignment that extends substantially precisely opposite to the Earth's force of attraction. A "horizontal" position is accordingly perpendicular, preferably substantially perpendicular, to a vertical position. According to the invention, "arranged above" is understood as meaning a position that is distal in relation to the Earth's surface. Correspondingly, "arranged below" is understood as meaning a position that is proximal in relation to the Earth's surface. According to the invention, "substantially perpendicular" is understood as meaning a positioning that is at an angle of 80° to 100°, preferably 90°. According to the invention, "substantially perpendicular" may also be understood as meaning a horizontal alignment, to be specific for example precisely whenever, as provided according to the invention in a preferred embodiment, the device for discharging the solid and liquid phases is at a right angle or substantially perpendicular to a shaft-like device for transporting the obtained beet-cossette/transporting-liquid mixture positioned perpendicularly or substantially perpendicularly on the Earth's surface.

In a preferred embodiment, the installation according to the invention has a device for feeding in raw juice or water, this device being formed such that the feeding in of raw juice or water can be performed in the transporting device and/or in the device for electrical treatment, in particular electroporation.

In a further preferred embodiment, the installation has a device for washing in the beet-cossette/transporting liquid mixture, the washing-in device being formed in a particularly preferred embodiment as a hopper.

In a further preferred embodiment, the transporting device is formed as a shaft. In a particularly preferred embodiment, this shaft has a base area of 30×40 cm. The transporting device may also be formed as a tube.

In a preferred embodiment of the invention, the installation has downstream of, for example after or below, the plant-material introducing region arranged above, in particular the beet-cossette introducing region, and upstream of, for example before or above, the plant-material removing region arranged below, in particular the beet-cossette removing region, a device for electrical treatment, in particular electroporation. It is preferably provided that the device for electrical treatment, in particular for electroporation, is formed as a tube or shaft reactor.

In a further preferred embodiment of the present invention, the conveying element arranged substantially perpendicularly or at a right angle to the transporting device is formed as a worm, preferably as a drawing-out worm, more preferably as a transporting worm.

In a further preferred embodiment of the present invention, the sucking element that preferably follows on from the conveying element is formed as a pump, preferably as a centrifugal pump.

Further advantageous refinements of the invention are provided by the subclaims.

The invention is explained in more detail on the basis of the following example and the associated figure:

BRIEF DESCRIPTION OF THE FIGURES

The device according to the invention is explained in more detail by the figure.

EXAMPLE

Figure 1:
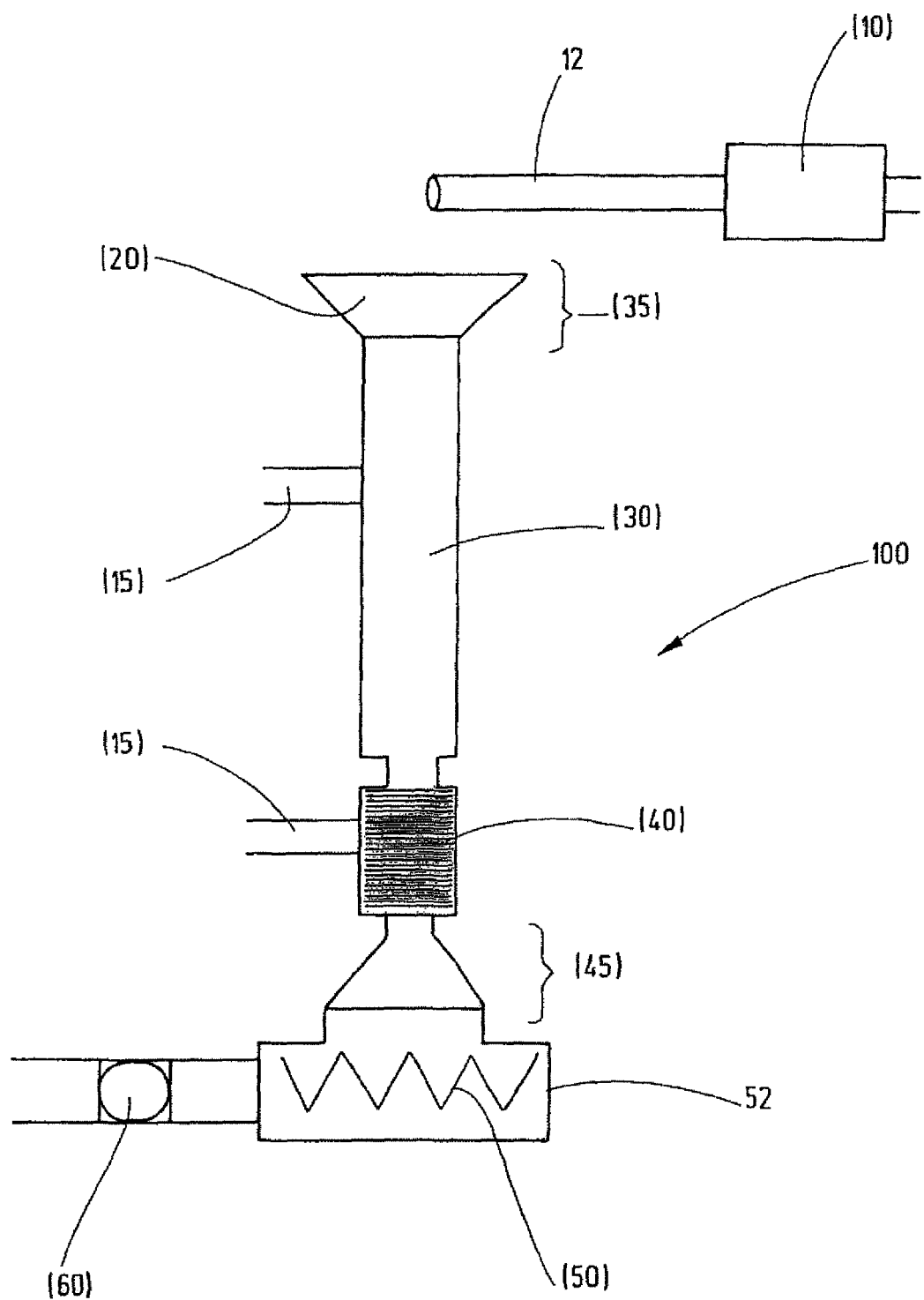
FIG. 1 shows a schematic representation of a preferred embodiment of the device according to the invention.
Figure 2:
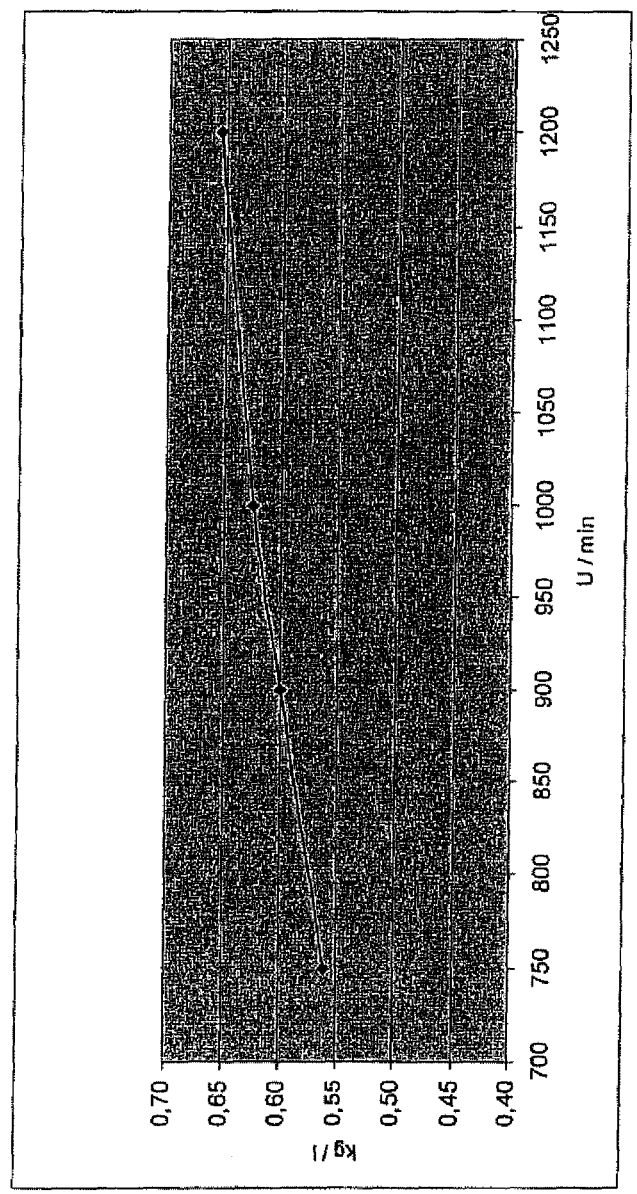
FIG. 2 shows the dependence of the packing density [kg/l] on the suction capacity of the pump in [rpm].

The Example is provided only for the purpose of illustrating the invention and is not to be construed as limiting
Electroporation of a Compacted Beet-Cossette/Transporting-Liquid Mixture The procedure according to the invention takes the following form in the installation (100) according to the invention, positioned vertically on the Earth's surface:

Sugar beets (not represented) are processed in a device (10) for comminuting into sugar beet cossettes. The beet-cossette/transporting-liquid mixture obtained after mingling into a transporting liquid is distinguished on the one hand by beet cossettes forming a solid phase and on the other hand by transporting liquid forming a liquid phase. The obtained beet-cossette/transporting-liquid mixture is washed into the transporting device (30) of the electroporation installation (100), configured as a shaft with the base area dimensions 30×40 cm, directly and pressurelessly, for example by means of a conveying belt (12), through a beet-cossette introducing region (35) arranged above, and also by means of a hopper (20). The obtained beet-cossette/transporting-liquid mixture is transported further through the shaft (30) into an electroporation reactor (40) arranged below the shaft (30). The electroporated beet-cossette/transporting liquid mixture passes via a beet-cossette removing region (45), arranged below, to a discharge device (52) arranged horizontally and perpendicularly in relation to the shaft. This discharge device (52) comprises a drawing-out worm (50) as a conveying element. The drawing-out worm transports the beet cossettes away and determines the transporting speed of the solid phase, that is to say the beet cossettes, of the beet-cossette/transporting-liquid mixture through the shaft (30) and in the electroporation reactor (40) (compare FIG. 3). The centrifugal pump (60) following on from the conveying element sucks the liquid and solid phases through the shaft (30) and the electroporation reactor (40), discharges the liquid phase and determines the bulk density in the shaft (FIG. 2). The centrifugal pump (60) is set such that the liquid phase is transported more quickly than the solid phase, which causes a sucking effect.

Figure 3:
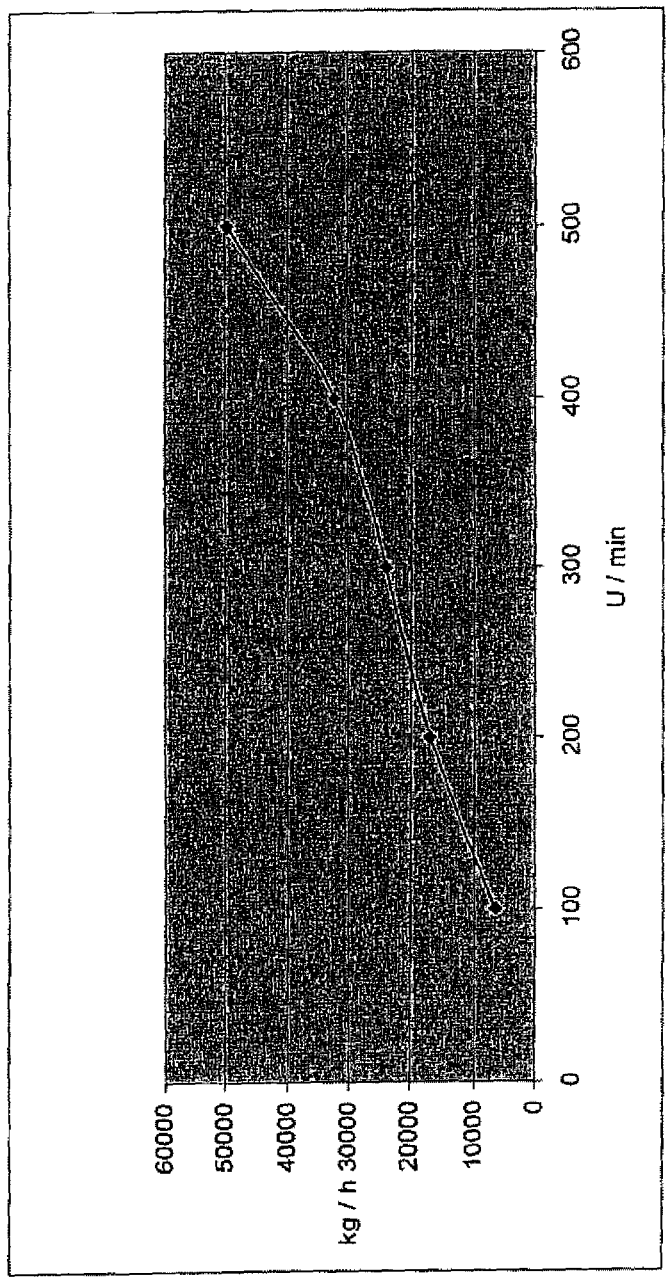
FIG. 3 shows the dependence of the beet-cossette throughput in [kg/rev] on the rotational speed of the horizontal worm in [rpm].
Figure 4:
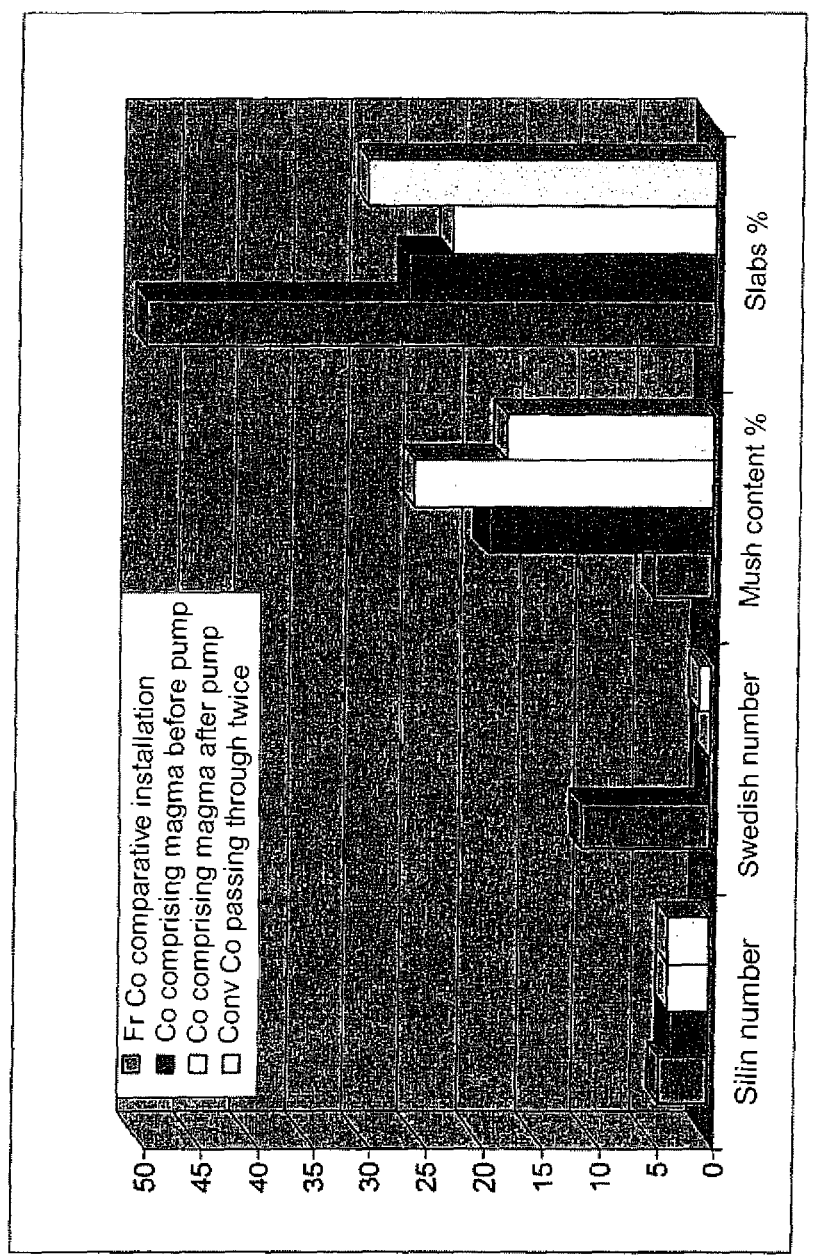
FIG. 4 shows a comparison of the beet-cossette destruction of the installation according to the invention with a comparative installation.
Figure 5:
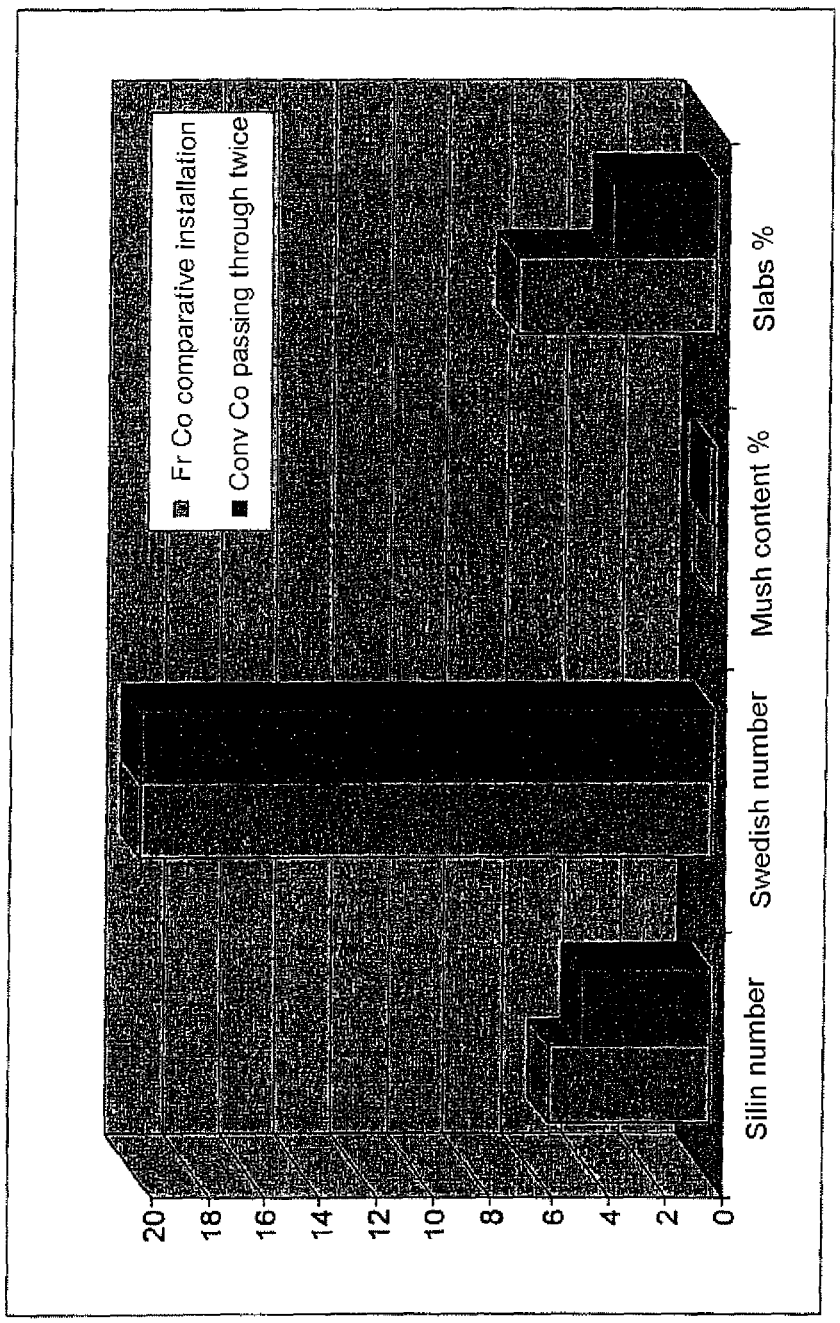
FIG. 5 shows a comparison of the beet-cossette destruction of the installation according to the invention with a further comparative installation.

The interaction of the drawing-out worm with the centrifugal pump has the effect of setting a transporting speed of the solid phase of 50 tonnes/h at rotational speeds of the drawing-out worm of 100 to 500 rpm. In this way, a packing density of the solid phase of the beet-cossette/juice mixture of 0.65 g/cm$^3$ is achieved. Furthermore, the packing density of the solid phase is set by a setting of the centrifugal pump to rotational speeds up to a maximum of 1200 rpm (FIGS. 2 and 3). An investigation of the mechanical loading of the beet cossettes shows that they are destroyed to the same extent or even less in comparison with conventional installations (FIGS. 4 and 5).

The parameters investigated in FIGS. 4 and 5, Silin number, Swedish number, mush content and slabs, are parameters which characterize the quality of the cossettes and are defined as follows: to determine the cossette quality, an average sample of about 100 g is taken and sorted into cossettes about 5 cm in length (mass $m_1$), between 1 and 5 cm in length (mass $m_2$) and below 1 cm in length (mass $m_3$).
Result:
Swedish number:

$$\frac{m_1}{m_3}$$

Mush content in %:

$$100 \cdot \frac{m_3}{m_1 + m_2 + m_3}$$

The term Swedish number used in FIGS. 4 and 5 is a measure of the juice permeability of the cossettes; it should be greater than 10. The mush content should not exceed 5%. 100 g of mush-free cossettes are arranged in a row on a grooved board (length 1 m). The overall length of the cossettes is read off in m.
Result: Silin number: length of 100 g of cossettes in m.

The Silin number characterizes the fineness or surface of the cossettes. The desired values depend on the extraction installation; for extraction towers, they usually lie in the range of 8 to 10 m per 100 g. If very coarse cossettes are cut and they include a proportion of "slabs", this is often also determined: the "slabs" from 1 kg of well-mixed cossettes are separated and weighed. The result is given in %. "Slabs" is the term used for the beet slices that are cut off from the beet when the cutting tool is set too coarsely.

The designations Fr—Co, Co and Conv Co have the following meaning: Fr—Co stands for fresh cossettes, that is to say freshly cut beet cossettes taken directly after the slicing operation. Co stands for beet cossettes that have to some extent passed through the extraction installation in the conventional process. In the actual example, they are beet cossettes that have been pretreated in the extraction machine, consequently both have been denatured by thermal means and also have undergone mechanical changes. Conv Co (conveyed cossettes) stands for freshly cut beet cossettes that have been circulated for a certain time in the conveying apparatus after removal from the process, and in this way have changed. They have mechanically changed to a certain degree, that is to say have been comminuted, and have therefore become shorter on average. By determining the aforementioned characteristic cossette parameters for the freshly cut cossettes, the cossettes from the extraction machine and the conveyed cossettes, the degree of cossette destruction or change can in each case be described.

FIGS. 4 and 5 show how the conveyance in the installation according to the invention has an effect on the mechanical stability and external form of the cossettes. FIG. 4 shows this by the example of cossettes that have been coarsely cut, and therefore also have many slices known as slabs. FIG. 5 shows this by cossettes that have been carefully cut and therefore have only very few slabs. It is shown in each case how in the installation according to the invention the form of the cossettes has changed in comparison with the original state when subjected to disproportionate mechanical loading, that is to say on average over time have passed through twice. FIG. 4 also shows how the form of the cossettes has changed as a result of the mechanical treatment in a comparative installation (Fr—Co comparative installation). The sampling points "cossettes and magma before pump" (Co comprising magma before pump) and "cossettes comprising magma after pump" (Co comprising magma after pump) thereby designate the respective samplings from the comparative installation after passing through the vessel for the thermal denaturing of the cossettes before and after the pump that conveys the beet-cossette/transporting-liquid mixture directly into the extraction installation.

FIG. 4 reveals that, in spite of the disproportionate mechanical loading, the form of the cossettes in the installation according to the invention is even impaired less than by the pretreatment in the comparative installation. The mush content, that is to say the proportion of small cossette particles, is lower and the so-called "Swedish number", which specifies the ratio of large, undestroyed cossettes to the small cossette particles produced by cossette destruction, is higher.

FIG. 5 reveals that, in the case of carefully cut beet cossettes with a low proportion of slabs, the degree of change in the form of the cossettes under disproportionate mechanical loading (passing through twice) is low. This shows in particular the extremely low mush content that has occurred during the conveyance of the cossettes in the installation according to the invention.

FIGS. 4 and 5 consequently demonstrate that the conveyance of the beet cossettes in the installation according to the invention takes place very gently, and this even means that there is an improvement over the prior art.

In the installation according to the invention, it is additionally found even after relatively long running times that there is no blockage caused by beet cossettes in the shaft.

What is claimed is:

1. A process for extracting contents from plant material, said process comprising the steps of:
    (a) comminuting the plant material into comminuted plant material forming a solid phase,
    (b) mingling the comminuted plant material into a transporting liquid while obtaining a solid phase and a liquid phase,
    (c) transporting the solid and liquid phases into a reaction chamber by introduction of said phases into said chamber without aid of any forced conveyance of the phases,
    (d) transporting the solid and liquid phases through the reaction chamber with simultaneous contactless application of energy for the extraction of the contents from the plant material, wherein a speed at which said solid phase is transported through the reaction chamber is controlled separately from a transport phase of said liquid phase through said chamber, wherein the transport speed of the liquid phase is higher than that of said solid phase, and wherein the liquid phase is transported only by a sucking element located downstream of the reaction chamber, and
    (e) suction-assisted discharging of the liquid and solid phases having the extracted contents, the liquid phase being sucked away by a sucking element and the solid phase being discharged from the reaction chamber by a conveying element acting mechanically on said solid phase.

2. The process according to claim 1, wherein the reaction chamber is at least one of a contactlessly operating mechanical and an electrical reaction chamber.

3. The process according to claim 1, wherein the contactless action is an ultrasound or shock-wave treatment.

4. The process according to claim 2, wherein the contactlessly operating reaction chamber is an electrical reaction chamber and a mechanical reaction chamber.

5. The process according to claim 1, comprising the steps of:
    (a) comminuting the plant material into comminuted plant material foaming a solid phase,
    (b) mingling the comminuted plant material into a transporting liquid while obtaining a solid phase and a liquid phase,
    (c) transporting the solid and liquid phases into an electrical reaction chamber by introduction of said phases into said chamber without aid of any forced conveyance of the phases,
    (d) transporting the solid and liquid phases through the electrical reaction chamber while simultaneously carrying out an electrical treatment for the extraction of the contents from the comminuted plant material, and
    (e) suction-assisted discharging of the liquid and solid phases having the extracted contents, the liquid phase being sucked away by a sucking element and the solid phase being discharged from the electrical reaction chamber by a conveying element acting mechanically on said solid phase.

6. The process according to claim 5, wherein the electrical reaction chamber is an electroporation device.

7. The process according to claim 1, wherein the plant material is selected from the group consisting of sugar beets, sugar cane, chicories, potatoes, apples and carrots.

8. The process according to claim 1, wherein the speed of the transport of the solid phase is set by the conveying element acting mechanically on the solid phase and the transport speed of the liquid phase is set by the sucking element.

9. The process according to claim 1, wherein the conveying element is a worm or a conveying belt.

10. The process according to claim 9, wherein the conveying element is a drawing out worm or a transporting worm.

11. The process according to claim 1, wherein the sucking element is a pump.

12. The process according to claim 11, wherein the pump is a centrifugal pump.

13. The process according to claim 1, wherein the speed of the transport of the solid phase is one selected from the group consisting of 30 to 80 tonnes of beet cossettes/h, 40 to 70 tonnes of beet cossettes/h, 45 to 60 tonnes of beet cossettes/h, and 50 tonnes of beet cossettes/h.

14. The process according to claim 1, wherein the speed of the transport of the solid phase is set by a conveying element formed as a worm.

15. The process according to claim 14, wherein said worm has a rotational speed up to a maximum of 500 rpm.

16. The process according to claim 15, wherein the rotational speed is selected from the group consisting of 1 to 500 rpm, 100 to 500 rpm and 200 to 400 rpm.

17. The process according to claim 1, wherein the solid phase has a packing density of 0.5 to 0.8 $g/cm^3$.

18. The process according to claim 17, wherein the solid phase has a packing density of 0.6 to 0.7 $g/cm^3$.

19. The process according to claim 18 wherein the solid phase has a packing density of 0.65 $g/cm^3$.

20. The process according to claim 1, wherein the sucking element is a pump having a rotational speed of a maximum of 1200 rpm.

21. The process according to claim 20, wherein said pump has a rotational speed selected from the group consisting of 750 to 1200 rpm and 800 to 1100 rpm.

22. The process according to claim 1, wherein the speed of the transport of the liquid phase is higher than that of the solid phase.

23. The process according to claim 1, wherein raw juice or water is added to the solid phase in step (a), (b), (c) or (d).

* * * * *